US006001208A

United States Patent [19]

Kinoshita et al.

[11] Patent Number: 6,001,208

[45] Date of Patent: Dec. 14, 1999

[54] METHOD FOR IN-MOLD MOLDING USING A LABEL

[75] Inventors: Harumi Kinoshita; Masunori Shimada; Akikazu Kosugi; Yasuyuki Shimizu, all of Tokyo; Yoshio Akiyama, Tochigi; Senichi Okita, Nagoya, all of Japan

[73] Assignee: Yoshino Kogyosho Co., Ltd., Tokyo, Japan

[21] Appl. No.: 08/243,097

[22] Filed: May 16, 1994

Related U.S. Application Data

[63] Continuation of application No. 08/093,581, Jul. 19, 1993, abandoned, which is a continuation of application No. 07/933,195, Aug. 21, 1992, abandoned, which is a division of application No. 07/489,523, Mar. 7, 1990, abandoned.

[30] Foreign Application Priority Data

Mar. 17, 1989 [JP] Japan ...................................... 1-65282

[51] Int. Cl.$^{6}$ ...................................................... B32B 31/26

[52] U.S. Cl. ............................ 156/245; 156/87; 156/277; 156/309.6; 264/509

[58] Field of Search ............................. 156/87, 245, 277, 156/309.6; 264/509

[56] References Cited

U.S. PATENT DOCUMENTS

| | | | |
|---|---|---|---|
| 3,108,850 | 10/1963 | Brandt . | |
| 3,207,822 | 9/1965 | Makowski . | |
| 3,324,508 | 6/1967 | Dickinson . | |
| 3,657,043 | 4/1972 | Ploetz et al. | 156/196 |
| 3,863,373 | 2/1975 | Kaercher et al. . | |
| 4,059,471 | 11/1977 | Haigh | 156/227 |
| 4,253,899 | 3/1981 | Takemoto et al. | 156/277 |
| 4,264,657 | 4/1981 | Tollette | 156/277 X |
| 4,323,411 | 4/1982 | Uhlig . | |
| 4,526,405 | 7/1985 | Hattemer | 283/81 |
| 4,528,055 | 7/1985 | Hattemer | 156/247 |
| 4,605,462 | 8/1986 | Lehner . | |
| 4,643,789 | 2/1987 | Parker et al. | 156/219 |
| 4,716,061 | 12/1987 | Winter . | |
| 4,802,295 | 2/1989 | Darr . | |
| 4,904,324 | 2/1990 | Heider | 264/509 |

FOREIGN PATENT DOCUMENTS

| | | |
|---|---|---|
| 0 085 784 | 8/1983 | European Pat. Off. . |
| WO 86/01550 | 3/1986 | European Pat. Off. . |
| 0 208 261 | 1/1987 | European Pat. Off. . |
| 0 281 701 | 9/1988 | European Pat. Off. . |
| 0 286 222 | 10/1988 | European Pat. Off. . |
| 60-225752 | 11/1985 | Japan . |

OTHER PUBLICATIONS

Plastics Finishing and Decoration, p. 388.

*Primary Examiner*—Curtis Mayes
*Attorney, Agent, or Firm*—Oliff & Berridge, PLC

[57] ABSTRACT

A method for applying a label, and a label for in-mold molding which comprises a printed layer formed on a surface of a non-oriented plastic base film over which a membrane layer for bonding to be welded by the heat of molded article at the time of the in-mold molding is overlapped. The label is inserted into a mold for the in-mold molding, the label is held on the proper position in the mold by vacuum suction, or by static electricity, and a moldable article, such as a container, is molded by injecting, filling the plastics into the mold or by expanding a parison which was placed in the mold.

6 Claims, 2 Drawing Sheets

METHOD FOR IN-MOLD MOLDING USING A LABEL

This is a Continuation Ser. No. 08/093,581 filed Jul. 19, 1993, now abandoned, which in turn is a Continuation of application Ser. No. 07/933,195, filed Aug. 21, 1992, now abandoned, which in turn is a Division of U.S. Pat. No. 07/489,523, filed Mar. 7, 1990, now abandoned.

BACKGROUND 0F THE INVENTION

The present invention relates to a label to be attached to containers, and a method for in-mold molding using such a label.

In most cases of shampoo and rinse containers, paper labels are utilized on these containers for decreasing cost.

It is also known that a label can be is formed by a plastic film, which is placed in a mold before the container is formed and then in-mold molding is conducted, whereby a container is formed with a bonded label on the surface thereof.

Conventional label for said shampoo and rinse containers, which are typically used and stored in a bathroom where there is frequently high temperature and humidity, have many disadvantages, for example, mildewing the label, peeling the label off by moisture absorption, providing soiled print, and providing unclear label indicia by impregnated inks, thereby, causing such products to have an unsanitary feeling and deteriorating the product image.

Although in-mold labeling of a plastic film label which is formed during container molding overcome difficulties with paper labels, there is still a problem during the in-mold molding in that when attempting to take out a single label from a label supply where many labels are stacked, double or triple labels are often taken out in stuck to each other because of static electricity generated by friction, so that it is difficult to take out the labels one by one.

Further, during in-mold molding, labels may be deformed and consequently accelerate container deformation.

And even if container is not deformed, the label may partially rise to the surface of the container, causing container deformation.

Furthermore, since the printed layer of a label bonded to the container is generally located on the exterior of the label, it is often damaged by friction or by contact with liquid filled in the container.

SUMMARY OF THE INVENTION

The present invention provides a label for in-mold molding which avoids mildew under at high temperature and humidity environments and without damaging the printed layer thereof and provides a process for in-mold molding which facilitates taking out the label during in-mold molding and prevents deformation of the label and the container.

According to the present invention, a label for in-mold molding comprises a printed layer formed on a surface of non-oriented plastic base film, over to which a membrane layer for bonding to be welded by the heat of molded article at the time of the in-mold molding is overlapped.

As a non-oriented plastic base film, for example, transparent or translucent polypropylene, polyethylene, polyester or polyvinyl chloride may be used individually or as part of a laminate. These material may be used in compatibility with the material of the moldable article like container, and so that their physical properties are compatible as the case may be.

The printed layer can cover the whole surface of the base film or only part of it.

And, when polypropylene and other high transparency plastic film is used for plastic base film, the printed layer can be seen through from the outside, and it gives a glossy surface since the printed layer is not exposed on the surface of the base film. When translucent material is used for the plastic base film, the printed layer can be seen from the outside as a frosted image, i.e., giving a difference appearance from that when transparent material is used.

For the material of the moldable article, polypropylene, polyethylene, polyvinyl chloride, polyester, polystyrene, AS resin or polyacrylonitrile are used.

As a membrane layer for bonding to be welded by the heat of the molded article at the time of the in-mold molding, for example, low melting point polypropylene film, polyethylene film, PVC film, PET film, a membrane having as a main component heat weldable adhesive wax, a membrane having as a main component co-polymer of ethylene vinyl acetete, or any membrane having as a main component polyvinyl acetal polymer, polyvinyl alcohol polymer, polyacryl acid esteric polymer, vinyl chloride polymer, polyethylene polymer, polyurethane polymer or polyester polymer.

And, if different materials are used for the moldable article and said plastic based film with inferior bonding compatibility to each other, a good labeling effect to the molded article can be achieved by using a membrane layer for bonding which has good bonding properties to both of the materials.

A number of emboss areas are provided on said membrane layer of the in-mold molding label, so that labels can be taken out one by one from a label supply in which labels are stored by stacking for in-mold molding. Sticking between the labels is prevented by the provision of the emboss areas by decreasing the generation of static electricity by decreasing the label contacting area, and by facilitating release of one label from another by the existence of air in each space between the labels.

According to the present invention, the in-mold molding method employs the aforementioned label, and thus the method has a number of advantages compared with conventional in-mold molding methods.

More particularly, according to the present invention, when said the label is inserted into a mold for the in-mold molding, label is held on the proper position in the mold by vacuum suction, or by static electricity, and the moldable article is molded by injecting, filling the plastics into a mold or by expanding a parison placed in a mold, whereby a membrane layer for bonding the label contacts a surface of the molded article, and said membrane layer for bonding is bonded to the molded article by welding by the heat which the molded article has.

In this connection, if emboss areas are provided on the surface of the membrane layer for bonding, any air existing in the space between the container surface and label is discharged to exterior through the emboss areas.

Further, since the plastic base film of label is formed of non-oriented plastic film, it does not shrink, as oriented film is by the heat driven by the in-mold molding, and subsequently it does not cause any deformation of the molded article accompanied with such shrinkage.

And when labeling is made to the molded article, the printed layer is positioned in the rear side of the plastic base film and is protected by the plastic base film, and thus the printed layer is not damaged by friction, and in case where the molded article is a container, it is also not damaged by liquid contained therein.

DETAILED DESCRIPTION OF THE PREFERRED EMBODIMENT

Figure 1:
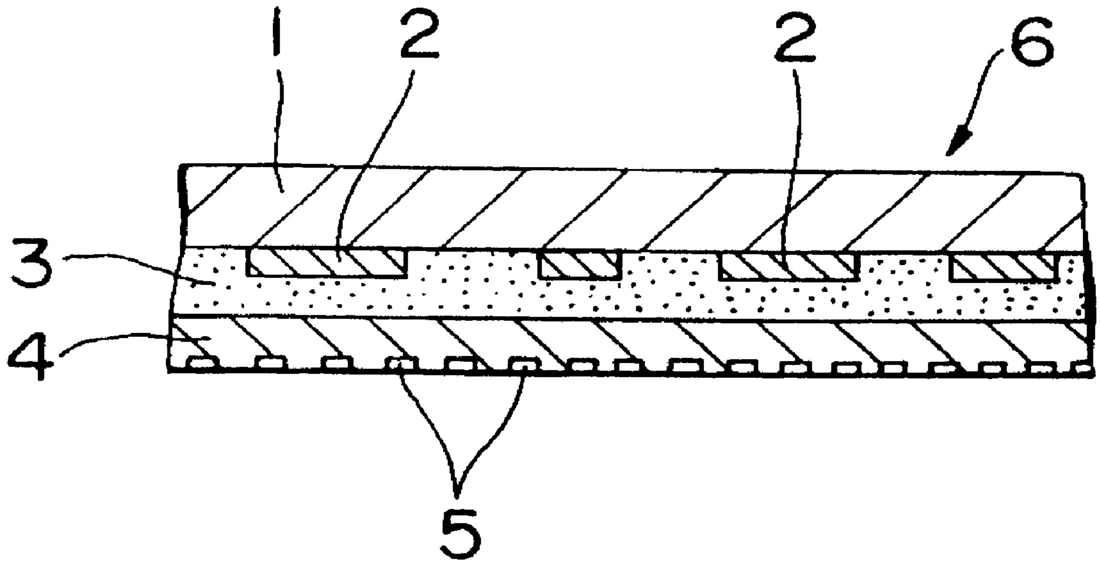
FIG. 1 is an enlarged cross sectional view showing a part of a label of an embodiment according to the present invention, and, FIGS. 2(*a*)–2(*e*) are views showing step of a process of molding in accordance with this invention.

An embodiment of the in-mold molding label 6 according to this invention comprises a printed layer 2 formed on the rear surface of a plastic base film 1 made of transparent non-oriented polypropylene having a thickness of 110μ a membrane layer for bonding 4 laminated on said printed layer 2, through an adhesive 3 made of synthetic resin, the membrane layer for bonding 4 adapted to be welded by the heat of the molded article at the time of the in-mold molding, the membrane layer being made of low melting point polypropylene film having a thickness of 30μ. And, on the surface of said membrane layer for bonding 4, emboss areas 5 are provided.

In the aforementioned embodiment, the polypropylene film of the plastic base film 1 may have a thickness of about 75μ~130μ , and the low melting point polypropylene film of the membrane layer for bonding 4 may have a thickness of about 15μ~45μ.

If, in the above embodiment, the material of said membrane layer for bonding 4 is capable of being bonded to the rear surface of the plastic base film 1 wherein the printed layer 2 is formed, the membrane layer for bonding 4 can be attached to the plastic based film 1 without using adhesive 3.

Now an embodiment of an in-mold molding method according to this invention is described.

Figure 2A:
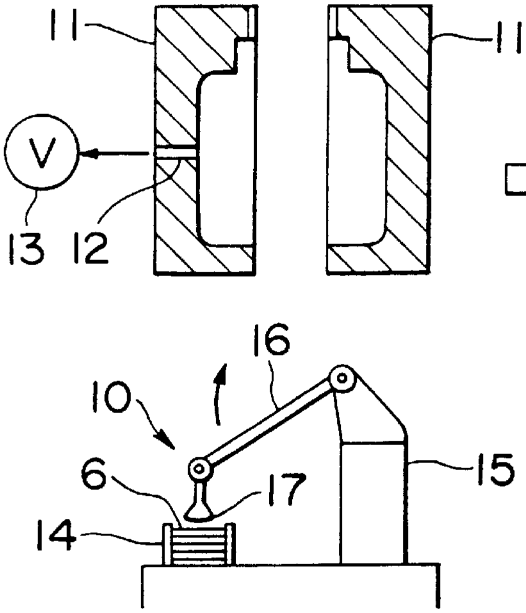
Figure 2B:
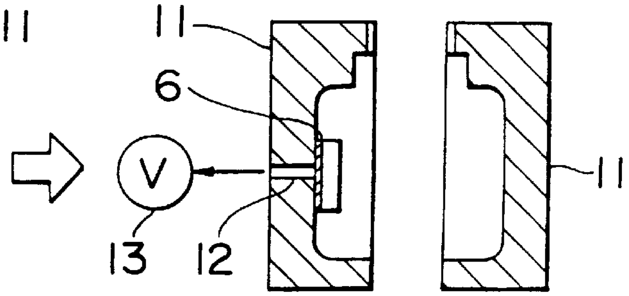
Figure 2C:
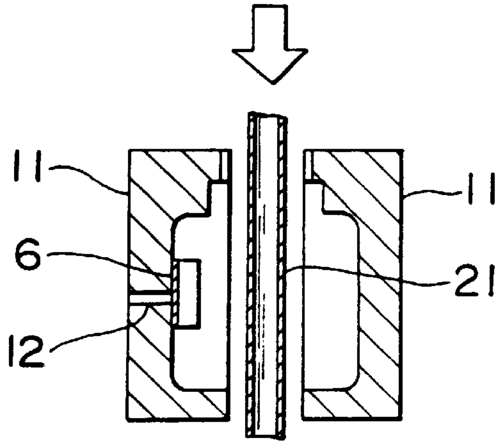
Figure 2E:
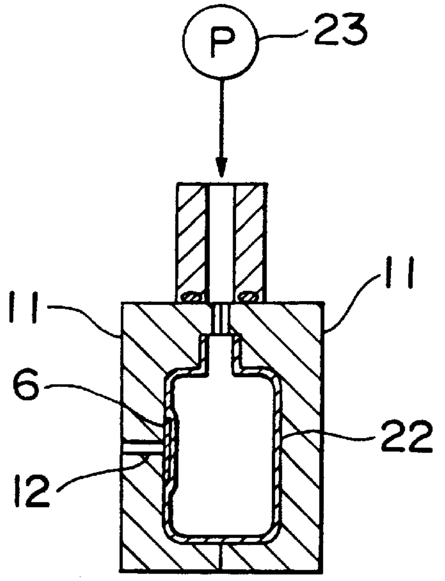
Figure 2D:
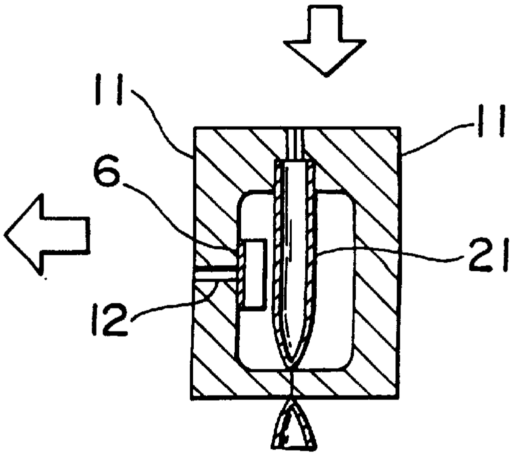

First, the molding equipment, as shown in FIG. 2 (*a*), consists of label supply unit 10 and container blow molding mold halves 11, 11, one of which has a suction orifice 12 which opens to a cavity, and said orifice 12 is connected with a vacuum suction unit 13, whereby a label 6 supplied from said label supply unit 10 is held in the mold (FIG. 2 (*b*)) by sucking a label 6 to the position of the suction orifice 12 by means of vacuum pressure by vacuum suction unit 13.

The label supply unit 10 has a label storing portion 14 and a label supply member 15. In said label storing portion 14, a number of labels 6 are stored by stacking. The label supply member 15 has a cupule 17 on the top end of a movable arm 16 enabling a label 6 to be supplied to the position of the suction orifice 12 in a mold 11 by moving the arm 16 and sucking by said cupule 17 a top positioned label 6 from the stored labels in the label storing portion 14. Of course, setting the label 6 into the mold 11 by taking out from the label storing portion 14 can be done by manual operation by an operator.

After setting a label 6 into the mold 11, a parison 21 or tubular shaped preform is placed in the mold 11, and the molded halves are clamped (FIG. 2 (*c*), (*d*)), and then a container 22 is flow-molded by expanding with air from a compression air source 23. By expanding the parison 21 or preform, the membrane layer for bonding 4 of label 6 contacts the surface of the container 22, so that said membrane layer for bonding 4 is bonded on the surface of the container 22 by welding by the heat of the container 22 from the blow-molding step (FIG. 2 (*e*)).

According to the present invention, since a non-oriented plastic base film 1 is used for the label 6, even though the label 6 is heated up by the in-mold molding, it does not deform the container 22 by shrinking the label 6, and label 6 itself has no phenomenon such as rising up to the surface of the container. Thus, the desired shape of the container can be obtained.

Further, as emboss areas 5 are provided on the surface of the membrane layer for bonding 4, when the label 6 are stacked for the in-mold operation, contacting areas of each of the labels 6 are decreased, static electricity generated by friction is also decreased, and labels 6 are not stuck together due to the existence of air in each space between the labels 6, whereby a label 6 can be taken out easily one by one, thus, increasing the operation efficiency.

Further, any air between the moldable container 22 and the label 6 during the in-mold molding is easily discharged through the emboss areas 5, and almost no air remains between the label 6 and the container 22. Thus, the entire surface of the label 6 is hermetically completely bonded to the container 22. This phenomenon is even more remarkably effective with larger label sizes.

Such obtained container 22 is protected by the plastic base film 1 which protects the printer layer 2 located at a rear side of the label 6 from being damaged by friction or liquid within the container 22, and the surface of the plastic base film 1 is kept glossy because the printed layer 2 is not exposed on the surface.

What is claimed is:

1. A method for in-mold molding a label to a molded article comprising the steps of:

forming a printed layer on an inner surface of a non-oriented plastic base film having an inner surface and an outer surface, the base film having a thickness of between 75–30μ;

forming a label by bonding a membrane layer directly on the printed layer formed on the inner surface of the non-oriented plastic base film so that said membrane layer directly contacts said printed layer to sandwich the printed layer between the base film and the membrane layer, the membrane layer being capable of bonding the label to the molded article by welding by having a thickness of between 15–45μ, the outer surface of the plastic base film layer forming an outer surface of the label;

inserting the label into a mold for in-mold molding, the label being oriented such that the outer surface of the plastic base film is adjacent to and facing the mold;

inserting a plastic article into the mold;

molding the plastic article to form a molded article; and bonding the label to the molded article by welding the membrane layer by heat from the molded article at the time of molding without deforming the plastic base film.

2. A method for in-mold molding as set forth in claim 1, wherein said membrane layer is a plastic film.

3. A method for in-mold molding as set forth in claim 2, wherein said membrane layer comprises a material selected from the group consisting of low melting point polypropylene film, polyethylene film, PVC film, and PET film.

4. A method for in-mold molding as set forth in claim 1, wherein said membrane layer comprises a material selected from the group consisting of heat weldable adhesive wax, copolymer of ethylene vinyl acetate, polyvinyl acetal polymer, polyvinyl alcohol polymer, polyacryl acid esteric polymer, vinyl chloride polymer, polyethylene polymer, polyurethane polymer and polyester polymer.

5. The method according to claim 1, wherein the step of forming a label includes directly bonding the membrane layer to the printed layer formed on the inner surface of the non-oriented plastic base film by heat bonding.

6. A method for in-molding as set forth in claim 1 further comprising the step of providing emboss areas on a surface of said membrane layer for bonding.

* * * * *

UNITED STATES PATENT AND TRADEMARK OFFICE

CERTIFICATE OF CORRECTION

PATENT NO. : 6,001,208

DATED : December 14, 1999

INVENTOR(S) : Harumi KINOSHITA et al.

It is certified that error appears in the above-identified patent and that said Letters Patent is hereby corrected as shown below:

Column 1, line 4, insert --of-- after "Continuation";

line 31, change "overcome" to --overcomes--;

line 35, delete "in";

Signed and Sealed this

Tenth Day of October, 2000

Attest:

Q. TODD DICKINSON

*Attesting Officer*

*Director of Patents and Trademarks*

UNITED STATES PATENT AND TRADEMARK OFFICE

CERTIFICATE OF CORRECTION

PATENT NO. : 6,001,208
DATED : December 14, 1999
INVENTOR(S) : Harumi Kinoshita et al It is certified that error appears in the above-identified patent and that said Letters Patent is hereby corrected as shown below:

| | | |
|---|---|---|
| Column 1, | line 17, | delete "is"; |
| | line 40, | insert --the-- after "if"; |
| | line 51, | delete "at"; |
| | line 64, | change "material" to --materials--. |
| Column 2, | line 9, | change "difference" to --different--; |
| | line 44, | delete "said"; |
| | line 45, | insert --the-- after "molding,"; |
| | line 53, | insert --the-- after "if"; |
| | line 59, | change "is" to --does--. |

Signed and Sealed this

Twenty-sixth Day of December, 2000

Attest:

Q. TODD DICKINSON

*Attesting Officer*

*Director of Patents and Trademarks*